United States Patent [19]
Risse et al.

[11] Patent Number: 6,139,807
[45] Date of Patent: Oct. 31, 2000

[54] APPARATUS FOR REMOVING $SO_2$ FROM FLUE GASES AND FOR PRODUCING AMMONIUM SULFATE SOLUTION

[75] Inventors: Theo Risse, Werne; Lourenço Ferrao, Dinslaken, both of Germany

[73] Assignee: Lurgi Lentjes Bischoff GmbH, Essen, Germany

[21] Appl. No.: 09/113,848

[22] Filed: Jul. 10, 1998

[30] Foreign Application Priority Data

Jul. 19, 1997 [DE] Germany .......................... 197 31 062

[51] Int. Cl.⁷ .................................................. B01D 53/50
[52] U.S. Cl. ........................ 422/171; 422/168; 422/170; 422/172
[58] Field of Search .................. 422/168–172, 422/177; 413/243.03, 243.06

[56] References Cited

FOREIGN PATENT DOCUMENTS

| 0 212 523 | 3/1987 | European Pat. Off. . |
| 0 620 187 | 10/1994 | European Pat. Off. . |
| 0 778 067 | 6/1997 | European Pat. Off. . |
| 37 33 319 | 9/1989 | Germany . |

*Primary Examiner*—Hien Tran
*Attorney, Agent, or Firm*—Herbert Dubno

[57] ABSTRACT

An apparatus for removing $SO_2$ from flue gas treats the hot flue gas with a sump liquid to quench the flue gas and saturate it with water while concentrating ammonium sulfate in the recycled liquid. The gas is then scrubbed in a packed scrubbing zone with a solution of ammonia water, untreated recycled ammonium sulfite and ammonium hydrogen sulfite, and ammonium sulfate solution from an oxidizer to which a partial stream of the scrubbing liquid is fed.

5 Claims, 1 Drawing Sheet

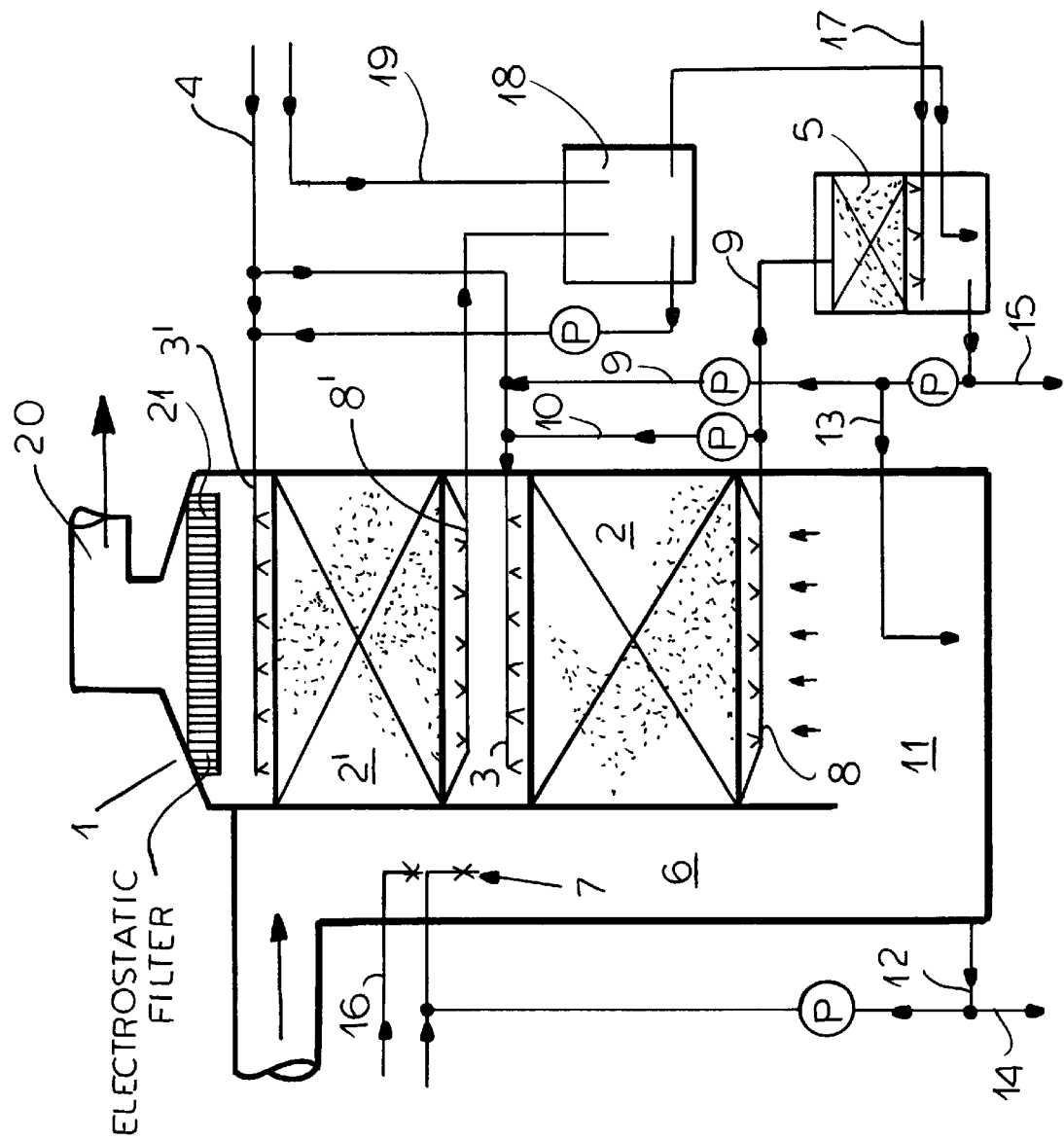

APPARATUS FOR REMOVING SO₂ FROM FLUE GASES AND FOR PRODUCING AMMONIUM SULFATE SOLUTION

FIELD OF THE INVENTION

Our present invention relates to an apparatus for removing $SO_2$ from flue gases and for producing ammonium sulfate solution which can be worked up to enable the recovery of a valuable substance (e.g. $(NH_4)_2SO_4$).

BACKGROUND OF THE INVENTION

DE-C-37 33 319 describes an apparatus for the scrubbing of flue gas which has a prescrubbing stage for the removal of hydrohalogen compounds and a gas scrubber following this prescrubbing stage which has three scrubbing zones. The intermediate or middle scrubbing zone is provided with a scrubbing liquid circulation utilizing as the scrubbing liquid or absorbent, ammonia water, i.e. a solution of $NH_3$ in water. From the scrubbing liquid circulation, a partial stream is branched through an oxidation unit and in the oxidation unit ammonium sulfite from the scrubbing liquid and ammonium hydrogen sulfide contained therein are transformed into ammonium sulfate.

In the prescrubber water is introduced with recirculation of the scrubbing water from the prescrubber sump to a spray unit in an upper portion of the prescrubber. From the prescrubbing sump a partial stream is branched to the scrubbing liquid circulation of the intermediate zone of the scrubber following the prescrubber.

Toxic and/or noxious components which are separated out in the prescrubber are, therefore, transferred to the absorbent circulation of the scrubber unit downstream of the prescrubber and are discharged with the ammonium sulfate solution from the oxidation unit. The ammonium sulfate solution can be subjected to evaporation to concentrate the ammonium sulfate therein, and to granulate the ammonium sulfate which precipitates out as an unpurified end product. The recovered ammonium sulfate can be used as a fertilizer or in fertilizers.

EP-A 620 187 describes an apparatus that also has a prescrubber for removing the hydrohalogen substances and a scrubber following the prescrubber for removal of the $SO_2$.

The scrubber sump is provided with sump aeration and the scrubbing liquid is primarily ammonium sulfate. The latter can be discharged from the scrubber and the scrubbing liquid within the scrubber can be discharged through spray nozzles. An ammonium sulfate partial stream is fed to the liquid sump of the prescrubber which forms a recirculation from the sump of the scrubber. Recirculation permits a concentration or thickening of the ammonium sulfate solution. Part of the thickening ammonium sulfate solution is withdrawn from the prescrubber sump, thickened by hydrocyclones and dried to from the ammonium sulfate which can be used as or in a fertilizer. The end product here is also contaminated by any noxious or toxic substances which can separate out in the prescrubber.

Apparatus having separate prescrubbers for the removal of hydrohalogen compounds and special gas scrubbers for the removal of $SO_2$ from such combustion gases are expensive. It is also a disadvantage with conventional apparatus that only a contaminated or impure end product can be obtained and even that end product may not be satisfactory as a fertilizer.

OBJECTS OF THE INVENTION

It is, therefore, the principal object of the present invention to provide an apparatus which can overcome the drawbacks of these earlier systems.

More particularly, it is an object of the present invention to provide an apparatus from which two aluminum sulfate solutions of different quality can be obtained.

It is also an object of the invention to provide an apparatus for the purposes described which has the simplest possible construction.

Yet another object of the invention is to provide an improved apparatus which can produce an ammonium sulfate product suitable for use in fertilizers and which yet is more effective in the removal of sulfur dioxide than has been the case heretofore.

SUMMARY OF THE INVENTION

These objects and others which will become apparent hereinafter are attained, in accordance with the invention, in an apparatus for the removal of $SO_2$ from flue gases and for the generation of ammonium sulfate solutions and which comprises a scrubber having at least one scrubbing zone traversed by the flue gas from a lower portion to an upper portion, a distributing unit arranged above the scrubbing zone for supplying a scrubbing liquid thereto and a gas permeable collecting bottom at a lower portion of the scrubbing zone for collecting the scrubbing liquid and passing the gas.

The apparatus further comprises a device for feeding water (ammonium water or ammonium hydroxide solution) to the scrubbing zone.

Means forming an oxidation zone is provided for oxidizing ammonium sulfite and ammonium hydrogen sulfite contained in the absorption liquid to ammonium sulfate.

The apparatus can include means forming an absorption liquid circulation path running between the collecting bottom and the oxidation unit and connecting the oxidation unit with the distributing device located above the scrubbing zone. A flue gas passage is provided for feeding the flue gas to the scrubber and opens above the scrubber sump in the scrubber housing.

A spray device is arranged in the flue gas passage for supplying a cooling liquid to the flue gas stream as well as a quenching liquid which is saturated with water vapor and which can be entrained as droplets in the flue gas stream to collect in the scrubber sump.

A device for recycling of the liquid from the scrubber sump to the spray device in the flue gas passage or smoke passage is likewise provided. According to the invention, the scrubber sump is provided with a feed line whereby ammonium sulfate from the oxidation unit can be fed thereto and a slurry line can be connected to the washer sump with which aluminum sulfate can be discharged to a concentrating unit for fertilizer production. A discharge line at the oxidation device is here provided to enable practically contaminant-free production of practically pure aluminum sulfate.

The scrubber sump is here used as a collecting vessel for the ammonium sulfate solution used as the quenching liquid as well as for the scrubbing liquid utilized in the prescrubbing operation. The scrubber sump is connected in a scrubbing liquid circulation in which there is a material exchange with the hot flue gas stream which results both in quenching of the gas and the thickening (concentration) of the ammonium sulfate solution. The absorption liquid used to pull $SO_2$ out of the flue gas is separately collected by a collecting bottom located below the scrubbing zone and is supplied to the oxidation unit. From the apparatus, a concentrated, although contaminated, ammonium sulfate solution can be withdrawn from the sump of the scrubber and in the oxidation device, in addition, there is a substantially contaminant-free ammonium sulfate solution whose ammonium sulfate concentration is reduced but can serve an ammonium sulfate production outputting pure $(NH_4)_2SO_4$. The production of both different ammonium sulfate solutions can be variable, to different degrees so that a specification true ammonium sulfate production as required in practice is possible.

In a preferred embodiment of the invention, the distributor for spraying the scrubbing liquid into the scrubbing zone, is provided with means for additionally supplying NaOH and/or KOH solutions thereto. KOH and NaOH bind halogens and neutralize them. Preferred is the use of KOH which provides a potassium component in the ammonium sulfate fertilizer.

It has been found to be advantageous to provide the scrubbing zone as a so-called packed zone, i.e. with a packing which can be of any conventional type, for instance raschig rains. A wet electrostatic filter can be built into the scrubber to avoid the release of aerosols ahead of the clean gas outlet of the scrubber.

According to another feature of the invention a second-absorption-liquid can be provided by means which of ammonium sulfite solution is directly supplied to the distributor, bypassing the oxidation zone. An apparatus with two absorption liquid circulations enables the introduction into the scrubbing zone of an absorption liquid which consists of a mixture of ammonia water, ammonium sulfite containing cycled water, and withdrawn from the sump or bottom of the scrubber and not subjected to any intermediate treatment, and ammonium sulfate solution which derives from the oxidation unit.

It has been found to be advantageous to maintain a mixing ratio between ammonium sulfite and ammonium sulfate which is in the range of 15:1 to 3:1 and preferably in the range of 10:1 to 5:1, by weight. The absorption liquid thus has very high absorption capacity and shows little or no tendency toward aerosol formation.

BRIEF DESCRIPTION OF THE DRAWING

The above and other objects, features, and advantages will become more readily apparent from the reference being made to the sole FIGURE of the accompanying drawing which shows an apparatus for removal of $SO_2$ from flue gas and for producing an ammonium sulfate solution which can be worked up further, e.g. to ammonium sulfate.

SPECIFIC DESCRIPTION

Basically the apparatus comprises a scrubber 1 having at least one scrubbing zone traversed from bottom to top by a flue gas. To allow the scrubbing liquid to be introduced into the scrubbing zone 2 a distributor 3 is provided above this one and is connected with means 4 for feeding ammonia water to the scrubbing zone.

An oxidation unit is connected to the bottom 8 and returns at least a portion of the scrubbing liquid which has ammonium sulfite and ammonium hydrogen sulfite, both of which can be oxidized in this unit to ammonium sulfate.

A flue gas duct 6 is supplied to deliver the flue gas to the zone 2 and within this flue gas duct a spray device 7 is provided for cooling the flue gas and quenching it and saturating it with water vapor.

Below the scrubbing zone 2 a gas permeable collecting bottom 8 for liquid is arranged, the collecting bottom delivering liquid to the oxidizing unit 5 which is, as noted, connected to the distributor 3.

The flue gas duct 6 opens within but above the scrubber sump 11 so that droplets of the quenching liquid are entrained in the flue gas stream and enter the scrubber sump. A feedback system 12 supplies liquid from the scrubber sump 11 to the spray device 7, thereby concentrating the ammonium sulfate in the recirculating path.

Via the line 13, ammonium sulfate from the oxidizer 5 can be supplied to the sump 11. From the scrubber sump 11, a slurry line 14 discharges a slurry which is suitable for fertilizer production. A substantially uncontaminated ammonium solution can be removed from the oxidizing unit 5 and for that purpose a pipe 15 has been provided. The ammonium sulfate solution which is there withdrawn need not be used for fertilizer but can be recovered as pure ammonium sulfate.

The apparatus is suitable for the removal of $SO_2$ from pure gases, which can arise in garbage incineration, a Claus plant, a power plant, a clarifier sludge incinerator or a sulfite roaster. The flue gas can be dedusted to a certain specification.

The flue gas is preferably brought, in the dedusting step to a temperature in the range of 160° to 350° C. so that no condensation of sulfuric acid droplets can occur. The entry temperature of the flue gas is such to require quenching and should be 110° to 180° C. as the flue gas enters the duct 6.

The flue gas is, as noted, sprayed with NaOH or KOH via line 16 to further eliminate hydrohalogen compounds. The flue gas is cooled and saturated with water vapor so that at a temperature between 45° and 60° C. with the gas saturated with water, the gas enters the scrubbing zone.

The cooled, water-saturated flue gas, then passes through the washer or scrubber in which the scrubbing liquid is a mixture of ammonia water, aqueous ammonium sulfate and freshly formed ammonium sulfite solution.

A partial stream of the absorption liquid is supplied at 9 to the oxidation unit 5 in which the ammonium sulfite and ammonium hydrogen sulfite are converted to an ammonium sulfate. The remainder of the absorption liquid is recirculated via the line 10, is mixed with the ammonia water and distributed over the packing in the scrubbing zone.

As noted, the scrubbing zone 2 is filled with a packing designed to increase the area between the flue gas and the absorption liquid, thereby permitting $SO_2$ absorption. Because of the packing the height of the scrubbing zone 2 and the height of the washer can be reduced. Any conventional packing (raschig rings) can be employed as long as it is inert to acid gases.

To achieve an effective absorption of $SO_2$ by the use of filters or packing, it is possible to reduce the height of the scrubbing zone and therefore the overall height of the scrubber. The raschigs are preferred although any packing bodies which have been used heretofore and are converted to the acid gases can be emptied.

To achieve an effective absorption of $SO_2$ the pH of the absorption liquid as it empties into the scrubbing zone is set between a pH between 5 and 6.5 preferably by the addition of ammonia water.

The oxidation unit 5 has an air feed line 17 connected with a blower. The oxidation unit carries out an intensive contact between the air and the $(NH_4)_2SO_3$ containing liquid. The resulting ammonium sulfate solution is collected in the sump of the oxidation unit 5. A partial stream of the ammonium sulfate solution is withdrawn at 15 and delivered to an ammonium sulfate recovery unit not shown. The ammonium sulfate recovery can be effected by evaporating the water to leave a pure crystalline ammonium sulfate.

Another partial stream is withdrawn at 13 and is supplied to the scrubber sump 11 and from there the sump liquid is recycled via line or feed back system 12 as a quenching liquid to cool the incoming flue gas. The process concentrates the ammonium sulfate to a maximum of 42% weight percent.

The liquid level in the sump of the oxidizing unit 5 is controlled by the supply of water or scrubbing liquid from a buffer receptacle 18 whereby the level in the sump of oxidation unit 15 is held constant.

In the drawing a second scrubbing zone 2', also with a packing, has been shown. A scrubbing solution of a pH between 4 and 6 is sprayed by the distributor 3' on the packing in the zone 2' and comes into contact with the rising gas. The depleted scrubbing liquid from the second scrubbing zone 2' is collected on the perforated bottom 8' and supplied to the buffer 18. The pH of the scrubbing solution is controlled by adding ammonia water and the liquid level in the sump of the buffer container is controlled by the addition of water via the line 19. The cleaned flue gas is discharged from the stack 20 after passing the wet electrostatic filter 21.

I claim:

1. An apparatus for removing $SO_2$ from a flue gas and for producing an ammonium sulfate solution from which ammonium sulfate can be recovered, said apparatus comprising:

a scrubber having at least one scrubbing zone traversed upwardly by the flue gas, a distributor above the scrubbing zone for distributing a scrubbing liquid in the upwardly traveling flue gas and for absorption of $SO_2$ therefrom, and a gas-permeable liquid-collecting bottom below said scrubbing zone;

means for feeding ammonia-containing water to said scrubbing zone to form part of the scrubbing liquid therein;

an oxidation unit receiving scrubbing liquid from said liquid-collecting bottom and containing ammonium sulfite and ammonium hydrogen sulfite and oxidizing said ammonium sulfite and ammonium hydrogen sulfite to ammonium sulfate;

means for forming an absorption-liquid circulation path connecting said liquid-collecting bottom with said oxidation unit and said oxidation unit with said distributor;

a flue gas duct opening above a sump in said scrubber;

a flue gas quench comprising a spray device opening into said duct and supplied with a water-containing quenching liquid to saturate said flue gas with water vapor and form droplets therein which are collected in said sump;

means for recirculating liquid collecting in said sump to said spray device;

means connecting said oxidation unit with said sump to supply ammonium sulfate solution thereto for concentration of said ammonium sulfate therein;

a slurry duct connected to said sump for discharging an ammonium sulfate solution from said sump suitable for fertilizer production; and means connected with said oxidation unit for discharging a solution containing substantially uncontaminated ammonium sulfate.

2. The apparatus defined in claim 1, further comprising means for supplying a solution of an alkali selected from the group which consists of NaOH and KOH to the flue gas duct prior to said flue gas quench.

3. The apparatus defined in claim 1, wherein said scrubbing zone is a zone containing packing and through which said scrubbing liquid trickles.

4. The apparatus defined in claim 1, further comprising a second absorption-liquid circulation path connected with said scrubber and delivering ammonium sulfite containing liquid directly to said distributor, bypassing said oxidation unit.

5. The apparatus defined in claim 1 further comprising a wet electric filter in said scrubber for separating aerosols therefrom and disposed ahead of a clean-gas outlet of the scrubber.

* * * * *